(12) United States Patent
Marugame

(10) Patent No.: US 7,876,320 B2
(45) Date of Patent: Jan. 25, 2011

(54) FACE IMAGE SYNTHESIS METHOD AND FACE IMAGE SYNTHESIS APPARATUS

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 901 days.

(21) Appl. No.: 11/791,626

(22) PCT Filed: Nov. 24, 2005

(86) PCT No.: PCT/JP2005/021517

§ 371 (c)(1),
(2), (4) Date: May 25, 2007

(87) PCT Pub. No.: WO2006/057267

PCT Pub. Date: Jun. 1, 2006

(65) Prior Publication Data

US 2008/0165187 A1      Jul. 10, 2008

(30) Foreign Application Priority Data

Nov. 25, 2004    (JP)    ............................. 2004-341166

(51) Int. Cl.
*G06T 17/00* (2006.01)
(52) U.S. Cl. ................. 345/420; 345/419; 345/423; 345/426; 345/582; 345/583; 345/473; 345/619; 345/629
(58) Field of Classification Search ............ 345/419, 345/420, 423, 426, 582, 585, 619, 629; 382/118, 382/195
See application file for complete search history.

(56) References Cited

U.S. PATENT DOCUMENTS

| | | | | |
|---|---|---|---|---|
| 5,850,463 A | * | 12/1998 | Horii | 382/118 |
| 6,463,176 B1 | * | 10/2002 | Matsugu et al. | 382/195 |
| 6,504,546 B1 | * | 1/2003 | Cosatto et al. | 345/473 |
| 6,654,018 B1 | * | 11/2003 | Cosatto et al. | 345/473 |
| 6,907,140 B2 | * | 6/2005 | Matsugu et al. | 382/195 |

(Continued)

FOREIGN PATENT DOCUMENTS

JP         9-62865         3/1997

(Continued)

OTHER PUBLICATIONS

Mukaida, Shigeru, et al., "Facial Image Synthesis System: FUTON-Evaluation as Tools for Cognitive Research on Face Processing-", IEICE (A), vol. J85-A, No. 10, pp. 1126-1137, Oct. 2002.

(Continued)

*Primary Examiner*—Kimbinh T Nguyen
(74) *Attorney, Agent, or Firm*—Scully, Scott, Murphy & Presser, P.C.

(57) ABSTRACT

A face image synthesis apparatus includes a storage device (2) and an arithmetic processing unit (1). The storage device (2) stores a plurality of face images and a plurality of feature points including an origin. The plurality of feature points are set to each of the plurality of face images. The arithmetic processing unit (1) generates a plurality of deformed face images by deforming the plurality of face images so that the origin and the other feature points thereof are matched to each other and generates a synthesized face image from the deformed face images.

26 Claims, 7 Drawing Sheets

U.S. PATENT DOCUMENTS

| | | | |
|---|---|---|---|
| 6,975,750 B2 * | 12/2005 | Yan et al. | 382/118 |
| 7,317,815 B2 * | 1/2008 | Steinberg et al. | 382/118 |
| 7,379,071 B2 * | 5/2008 | Liu et al. | 345/582 |
| 7,587,068 B1 * | 9/2009 | Steinberg et al. | 382/118 |

FOREIGN PATENT DOCUMENTS

| | | |
|---|---|---|
| JP | 10-91808 | 4/1998 |
| JP | 2000-36056 | 2/2000 |
| JP | 2000-67261 | 3/2000 |
| JP | 2000-357221 | 12/2000 |
| JP | 2003-242480 | 8/2003 |
| JP | 2003-296713 | 10/2003 |
| JP | 2004-5265 | 1/2004 |
| JP | 2004-178163 | 6/2004 |

OTHER PUBLICATIONS

Murakami, K. et al., "On the Facial Caricaturing System PICASSO Using Visual Illusion", Transactions of Information Processing Society of Japan, Oct. 15, 1993, pp. 2106-2216, vol. 34, No. 10.

* cited by examiner

FACE IMAGE SYNTHESIS METHOD AND FACE IMAGE SYNTHESIS APPARATUS

TECHNICAL FIELD

The present invention relates to a face image synthesis method and a face image synthesis apparatus for synthesizing face images.

BACKGROUND ART

At study levels, it has been practiced to synthesize two or more face images, or at least one face image and one face graphics or a face animation to thereby create a fictional face image, although few of them are commercialized. With a conventional method, a large number of characteristic points, like three-dimensional polygon mapping 100 as shown in FIG. 1, are inputted over the face in each of two images to thereby synthesize the faces attached to a face standard model. This method requires extraction of a large number of characteristic points over the face and complicated calculation, which are difficult to execute on a portable terminal.

As a related technology, Japanese Laid-Open Patent Application (JP-P2003-242480A) discloses an image processing method and a server for utilize this method. This image processing method matches an existing image stored in an image database of a server with a portrait inputted into a user terminal to generate an intermediate image in accordance with user's customization requests and then provide it to the user terminal. That is, a face image is transmitted to the server through a network, synthesis processing is performed in the server, and the results are transmitted again to the terminal through the network.

Japanese Laid-Open Patent Application (JP-A-Heisei, 9-62865) discloses a face image processing method and a face image processing device. This face image processing method, using two face images (G1 and G2), a face image (G3) serving as a background, and shape models matched with these face images (G1, G2, and G3), respectively, synthesizes the face images with characteristic of the face images (G1 and G2) added to the face image (G3) serving as a base. Focusing on the characteristic portion of the face image (G1), by converting coordinates at a predetermined point corresponding to the characteristic portion of the shape model of this face image (G1) into coordinates at a corresponding point of the shape model of the background face image (G3), the face image (G2) is roughly matched with the background face image (G3), then coordinate values at points respectively corresponding to the post-matching shape models of the face images (G1 and G2) and the shape model of the face image (G3) are subjected to shape interpolation with a predetermined ratio, and then these shape models subjected to the shape interpolation are subjected to color interpolation with a predetermined ratio for respective corresponding pixels.

Japanese Laid-Open Patent Application (JP-A-Heisei, 10-91808) discloses a face image information conversion method and a face image information converter. This face image information conversion method includes the steps of: based on face image information including a plurality of different expressions of a predetermined human being, with the entire face serving as a processing unit, extracting a plurality of expression components for each of the expressions respectively corresponding to components of projection to a plurality of coordinate axes on a face image expression space; calculating a plurality of synthetic expression components corresponding to the face image information of the synthetic expression provided with an arbitrary ratio between the two arbitrarily specified different expressions, which is achieved by interpolation of the expression components corresponding to the two different expressions; and generating synthesized face image information in accordance with the plurality of synthetic expression components.

Japanese Laid-Open Patent Application (JP-P2004-178163A) discloses an image processing method and a device thereof. This image processing method includes the steps of: inalienably associating decoration and arrangement information of this decoration in a body part area; setting position of the body part area in an input image; by using the arrangement information associated with the decoration, defining the arrangement of the decoration so that it matches with the position of the set body part area and synthesizing the decoration with the input image; and outputting the synthesized input image.

Japanese Laid-Open Patent Application (JP-P2004-5265A) discloses an image synthesis method, an image synthesis device, and an image synthesis system. This image synthesis method includes: face image acquisition step for acquiring two face images, a base image generation step for generating a base image by synthesizing the two face images described above through morphing synthesis; a characteristic face image acquisition step for acquiring a characteristic face image; and a character addition step for generating a character-added image by synthesizing the characteristic face image described above and the base image described above through morphing synthesis.

Japanese Laid-Open Patent Application (JP-P2003-296713A) discloses a face image synthesis apparatus, a face image synthesis method and a program for executing this method, and a communication terminal provided with this face image synthesis apparatus and a communication method performed by this communication terminal. This face image synthesis apparatus is provided with: image input means adapted to take in an image including a human face; facial region acquiring means adapted to acquire a facial region including a head part of the human being from the taken image; and facial region processing means adapted to process image data in the acquired facial region to create a new face image.

Japanese Laid Open Patent Application (JP-P2000-67261A) discloses a face moving image creation method and device, and a recording medium on which this method is recorded. This face moving image creation method has: in a face moving image creation method in which two human face images whose eye and mouth open/close states are different from each other when viewed almost from the front are inputted to create a moving image, an eye position detection stage for detecting the position of the eyes based on the inputted two human face images; a mouth position detection stage for detecting the position of the mouth based on the inputted two human face images; an eye deformation control point arrangement stage for arranging around the eyes control points for deformation based on the eye position information detected in the eye position detection stage and associating the control points of the two human face image with each other; a mouth deformation control point arrangement stage for arranging around the mouths control points for deformation based on the mouth position information detected in the mouth position detection stage and associating the control points of the two human face image with each other; an in-between image generation stage for generating a plurality of in-between images with different eye and mouth open/close states obtained by deforming the inputted two human face images based on the control point information on the eyes and the mouth arranged in the eye deformation control point arrangement stage and the mouth deformation control point arrangement stage, respectively; and an image synthesis processing stage for synthesizing the human face moving images based on the plurality of in-between images generated in the in-between image generation stage and the two inputted human face images.

One of problems associated with synthesis of two face images is that simply performing weighted averaging while matching only one point may dislocate places, such as eyes or the like, whose color is largely different from that of the skin, so that these places remain like ghosts, thus resulting in unnatural synthesis. Thus, as described above, a method using three-dimensional polygon mapping is used. With this method, the outstanding characteristic parts on the two faces described above can be matched with each other. Thus, the ghost no longer appears, but it is required to extract a large number of characteristic points over the faces and perform complicated calculation, which are difficult to execute by a portable terminal with a limited input interface or limited calculation processing capability in particular.

There is another problem attributable to the nature of face synthesis. Facial characters include texture and arrangement of major parts like eyes, a nose and a mouth. For example, to mix together the face of a person A and the face of a person B with a ratio of 7:3, they need to be mixed for two purposes. That is, the mixing ratio needs to be 7:3 for the texture; and 70 percent needs to be set for the face of the human A and 30 percent needs to be set for the face of the human B in facial part arrangement. The facial parts arrangement mixture requires complicated calculation when a polygon mapping related method is applied. As a method of avoiding the problem involved in the practice with the portable terminal mentioned above, there is, as in Japanese Laid-Open Patent Application (JP-P2003-242480A), a method of transmitting face data to a server via a network and performing synthesis on the server, although many users have difficulty in accepting this method since the method involves communication charge and is also time-consuming depending on network conditions.

DISCLOSURE OF INVENTION

It is an object of the present invention to provide a face image synthesis method and a face image synthesis apparatus capable of performing face image synthesis under the environment, like the portable terminal, with limited input interface or a calculation processing capability.

It is another object of the present invention to provide a face image synthesis method and a face image synthesis apparatus capable of preventing a ghost in a synthesized face image appeared as the result of the dislocation of a place, such as eyes, whose color is largely different from that of the skin from appearing.

It is still another object of the present invention to provide a face image synthesis method and a face image synthesis apparatus capable of reducing required load imposed on an operator for synthesizing face images.

These objects and other objects and advantages of the present invention can be easily confirmed with reference to description below and the accompanying drawings.

For solving the above mentioned problems, the face image synthesis apparatus according to the present invention includes a storage device and an arithmetic processing apparatus. The storage device stores face images and feature points including an origin. The feature points are set to each of the face images. The arithmetic processing unit generates deformed face images by deforming the face images. In the deformed face images, the feature points match to each other. The arithmetic processing unit generates a synthesized face image from the deformed face images.

In another aspect of the present invention, in the face image synthesis apparatus, the feature points include a basing point and a reference point. The arithmetic processing unit includes an image scaling section, an image normalizing section and an image synthesizing section. The image scaling section is configured to generate scaled face images by scaling the face images based on the face images and the feature points to a distance between preset feature points of each of the scaled face images being same. The image normalizing section is configured to calculate a location of the reference point from the origin in each of the scaled face images based on the scaled face images and the feature points, to set a location of the reference point after face image synthesis, and to generate the deformed face images which are normalized to the reference point of each of the scaled face images being located in a position of the reference point after face image synthesis. The image synthesizing section is configured to generate the synthesized face image by matching the reference point of each of the deformed face images and calculating a weighted average of at least one of a color and a luminance by a synthesis ratio for each pixel based on the deformed face images and the feature points.

In another aspect of the present invention, in the face image synthesis apparatus, the arithmetic processing unit generates the synthesized face image by averaging the plurality of deformed face images for each pixel.

In another aspect of the present invention, in the face image apparatus, the feature points includes a first point located in first quadrant, a second point located in second quadrant, a third point located in third quadrant and a fourth point located in fourth quadrant from the origin.

In another aspect of the present invention, in the face image apparatus, the arithmetic processing unit calculates scaling factors to be continuous in an arbitrary region of the deformed face image, supposing that a coordinate of an arbitrary point of an arbitrary face image of the face images is (x1, y1), and the arbitrary point is moved to (x2, y2) in a corresponding deformed face image, and the scaling factors are represented by (r, s)=(x2/x1, y2/y1).

In another aspect of the present invention, the face image synthesis apparatus further includes a portable package including the storage device and the arithmetic processing unit; a display configured to display the plurality of face images and the synthesized face image; and an input unit configured to accept an input of the feature points.

For solving the above mentioned problems, a face image synthesis method according to the present invention includes: (a) obtaining face images and feature points including an origin which are set to each of the face images; (b) generating deformed face images by deforming the face images to include mutually at least two of the feature points located at same positions; and (c) generating a synthesized face image based on the deformed face images.

In another aspect of the present invention, in the face image synthesis method, the feature points include a basing point and a reference point. And (b) generating includes: (b1) generating scaled face images by scaling the face images based on the face images and the feature points to a distance between preset feature points of each of the scaled face images being same; (b2) calculating a location of the reference point from the origin in each of the scaled face images based on the scaled face images and the feature points, setting a location of the reference point after face image synthesis, and generating the deformed face images which are normalized to the reference point of each of the scaled face images being located in a position of the reference point after face image synthesis; and (c) generating includes:

(c1) generating the synthesized face image by matching the reference point of each of the deformed face images and calculating a weighted average of at least one of a color and a luminance by a synthesis ratio for each pixel based on the deformed face images and the feature points.

In another aspect of the present invention, in the face image synthesis method, (b2) calculating includes: (b21) calculating scaling factors to be continuous in an arbitrary region of the deformed face image, supposing that a coordinate of an arbitrary point of an arbitrary face image of the face images is (x1, y1, and the arbitrary point is moved to (x2, y2) in a corresponding deformed face image, and the scaling factors are represented by (r,s)=(x2/x1, y2/y1).

In an aspect of the present invention, a computer program product for face image synthesis has a program code means which, when used on a computer, perform the face image synthesis method according to the present invention.

In an aspect of the present invention, a computer program product for face image synthesis is embodied on a computer-readable medium and including the program code.

BEST MODE FOR CARRYING OUT THE INVENTION

Hereinafter, a face image synthesis method and a device and a program thereof according to the present invention will be described referring to the accompanying drawings.

Figure 1:
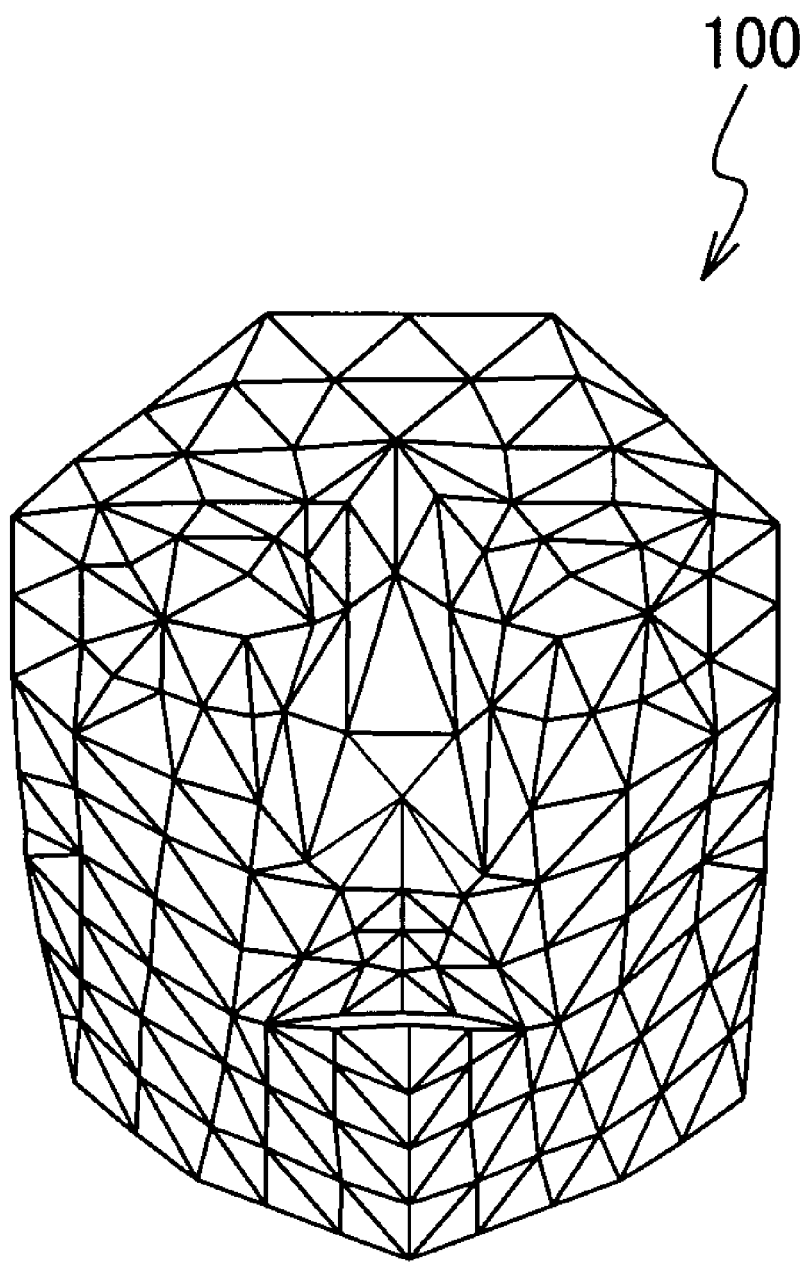
FIG. 1 is an example of a three-dimensional polygon map according to a background art.
Figure 2:
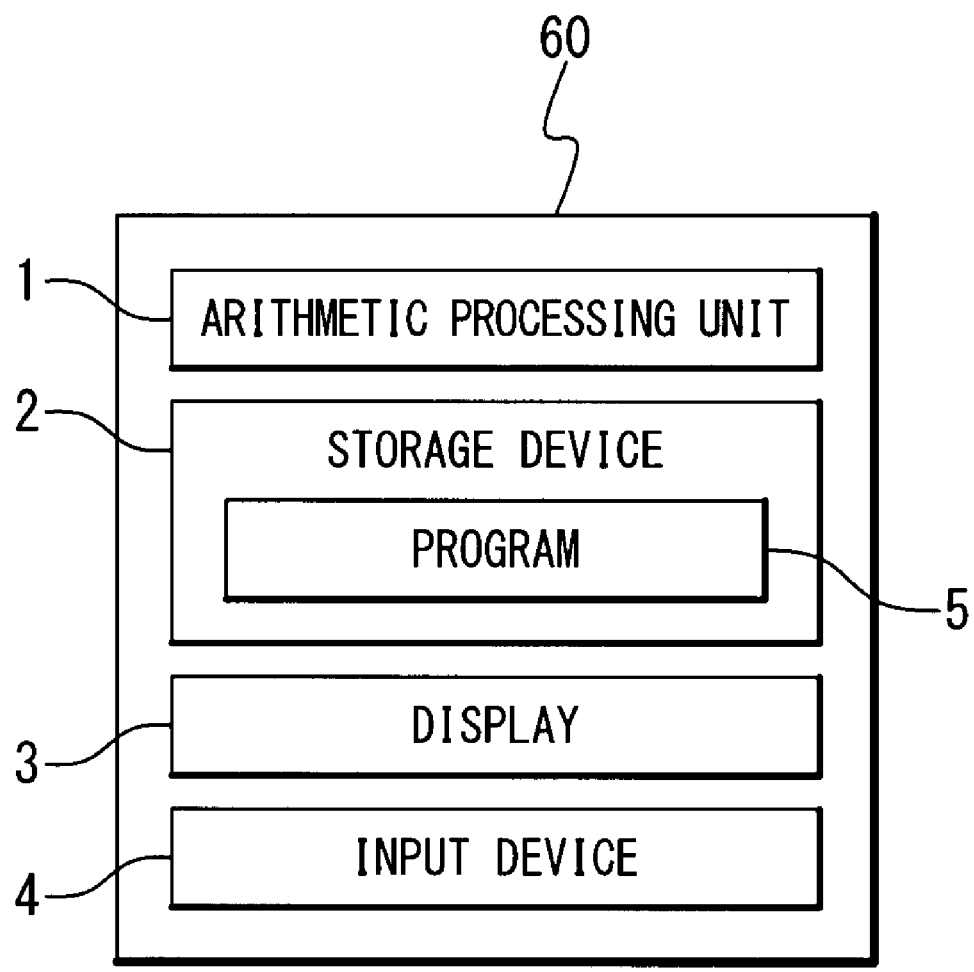
FIG. 2 is a configuration diagram in an embodiment of a face image synthesis apparatus according to the present invention.

FIG. 2 shows the configuration in an embodiment of the face image synthesis apparatus according to the present invention. The face image synthesis apparatus 60 is provided with an arithmetic processing unit 1, a storage device 2, a display 3, and an input device 4. The storage device 2 stores a program 5. The arithmetic processing unit 1 is exemplified by a CPU (central processing unit). The storage device 2 is exemplified by a memory or a hard disk. The display 3 is exemplified by a liquid crystal display. The input device 4 is exemplified by a keyboard.

Figure 3:
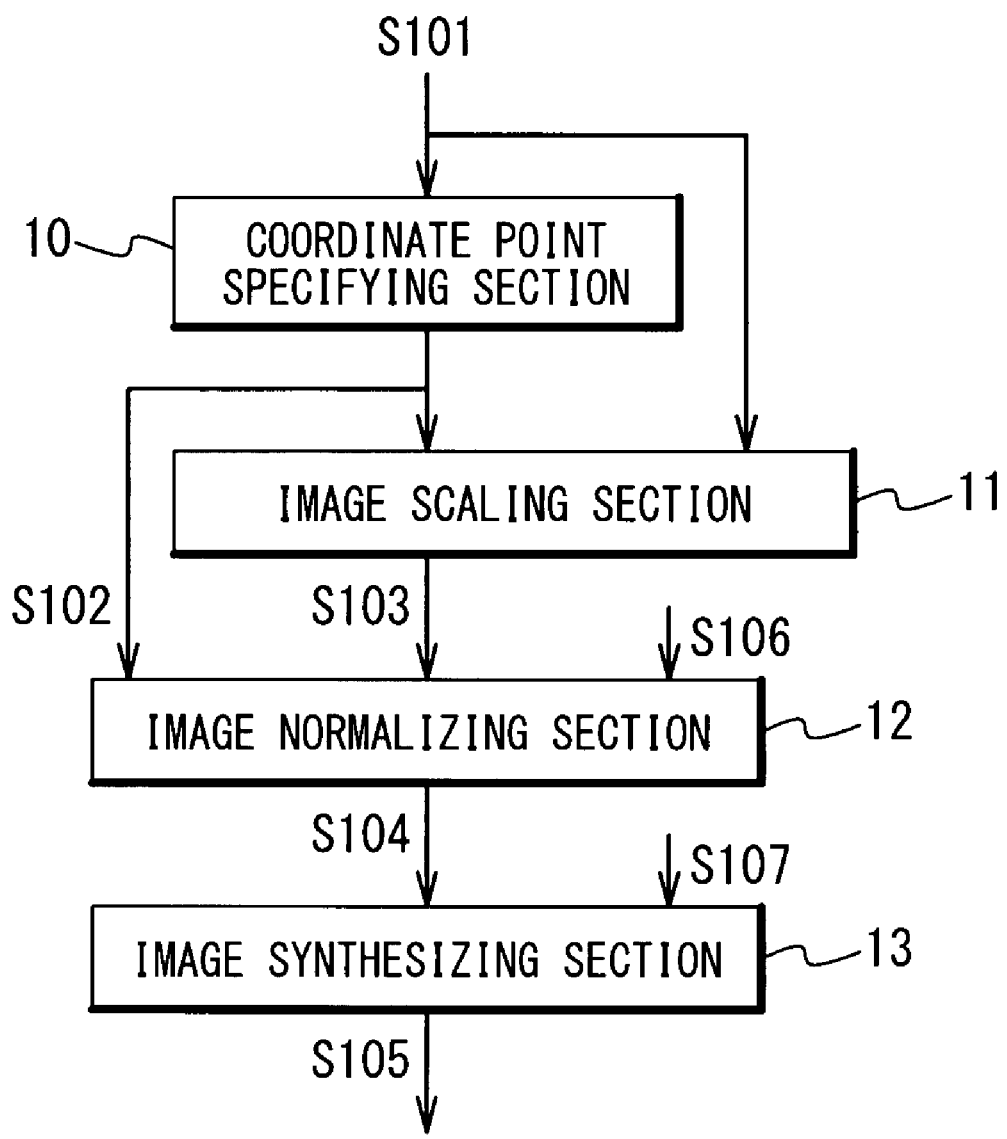
FIG. 3 is a configuration diagram in an embodiment of the face image synthesis apparatus according to the present invention.

FIG. 3 shows the configuration in an embodiment of the face image synthesis apparatus according to the present invention. The face image synthesis apparatus 60 is provided with a coordinate point specifying section 10, an image scaling section 11, an image normalizing section 12, and an image synthesizing section 13.

The coordinate point specifying section 10 specifies characteristic points S102 for each of a plurality of input face images S101. The characteristic points S102 include a basing point (lower end of the nose or the like) and reference points (both eye center points, left and right mouth ends, and the like). The coordinate point specifying section 10 is implemented by the display 3 which displays the input face images S101, the input device 4 which receives specification of position on the display screen displayed by the display 3, and the storage device 2 which stores coordinates of the position specified. The coordinate point specifying section 10 can be omitted if information specifying the characteristic points S102 has been already obtained together when the input face images S101 are inputted.

The image scaling section 11, based on the characteristics points S102, generates an image S103 obtained through scaling based on the distance between the two eye centers out of the reference points. The image normalizing section 12, based on the characteristic points S102, calculates position of the reference point with the basing point defined as an origin, sets a reference point positions S106 after synthesis, generates an image S104 normalized so that the reference point moves from the image S103 to the reference points after the synthesis. The image synthesizing section 13 matches the basing points of each of the normalized face images S104 with each other and subjects the colors or the luminance to weight-averaging with a desired synthesis ratio S107 for each pixel to thereby create a synthesized face image S105. The image scaling section 11, the image normalizing section 12, and the image synthesizing section 13 are implemented through processing executed by the arithmetic processing unit 1 in accordance with procedures described in the program 5 read by the arithmetic processing unit 1.

Figure 4:
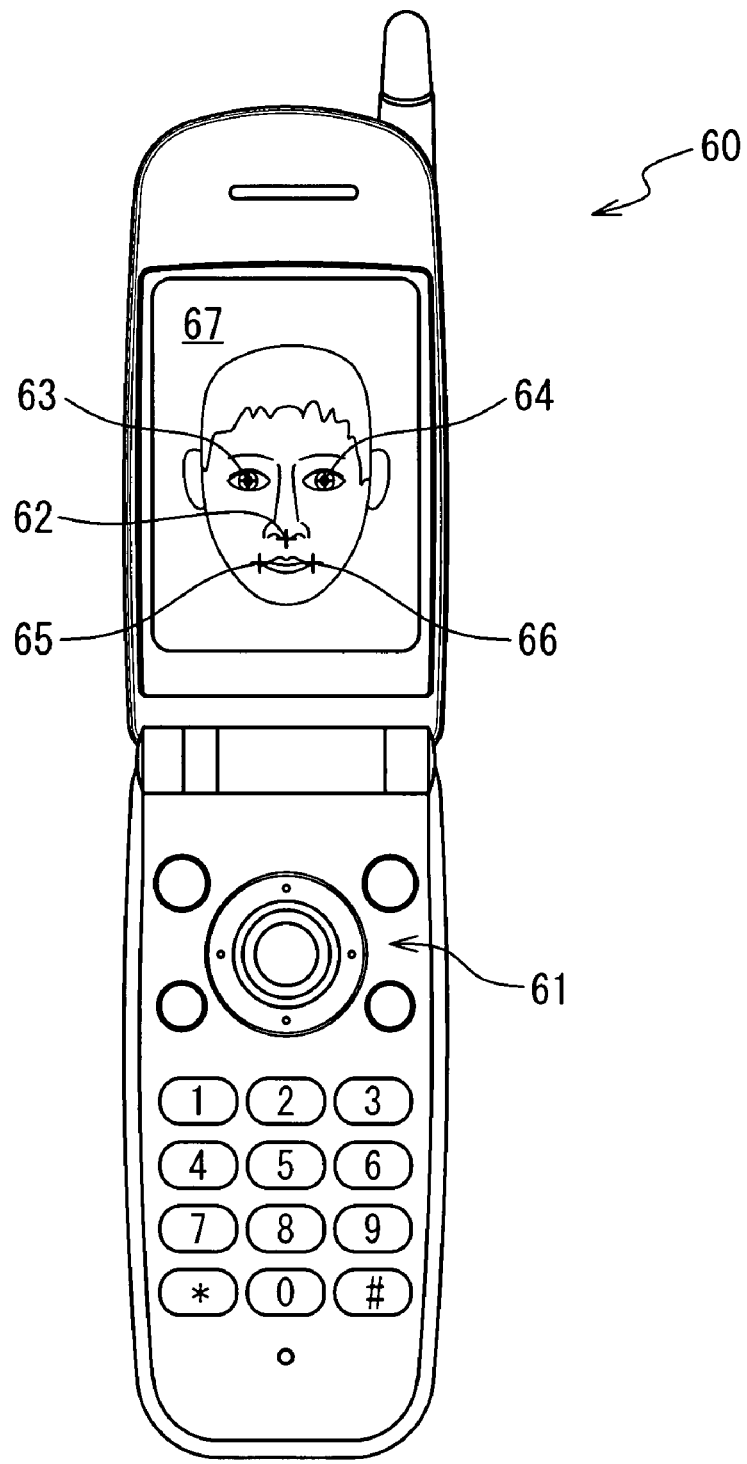
FIG. 4 is an external view showing an example of the embodiment of the face image synthesis apparatus according to the present invention.

FIG. 4 shows one example of the appearance of the face image synthesis apparatus according to an embodiment of the present invention. It is preferable that the face image synthesis apparatus 60 is loaded in a portable terminal device such as a mobile phone or the like. It is preferable that the face image synthesis apparatus 60 is loaded in a portable terminal device such as a mobile phone or the like provided having a camera (not shown) in particular. The face image synthesis apparatus 60 is provided with a display device 67. The face image synthesis apparatus 60 is provided with: a pointing device 61 capable of specifying an arbitrary position of an image displayed by the display device 67; and numeric keys through which a numeric number can be specified. The display device 67 corresponds to the display 3 mentioned above. The pointing device 61, the numeric keys 69 and the camera (not shown) correspond to the input device 4 mentioned above.

The display device 67 displays the input face image S101. The input face image S101 is an image photographed by the camera (not shown) attached in the face image synthesis apparatus 60, an image set as default in the storage device 2 provided in the face image synthesis apparatus 60, or an image received by a communication device provided in the face image synthesis apparatus 60.

On the input face image S101, a basing point 62, an upper left reference point 63, an upper right reference point 64, a lower left reference point 65, and a lower right reference point 66 are set through the pointing device 61. In a case where the input face image S101 is a face-like image, such as a character without a mouth, only the upper left reference point 63 and the upper right reference point 64 are set as the reference points.

Figure 5:
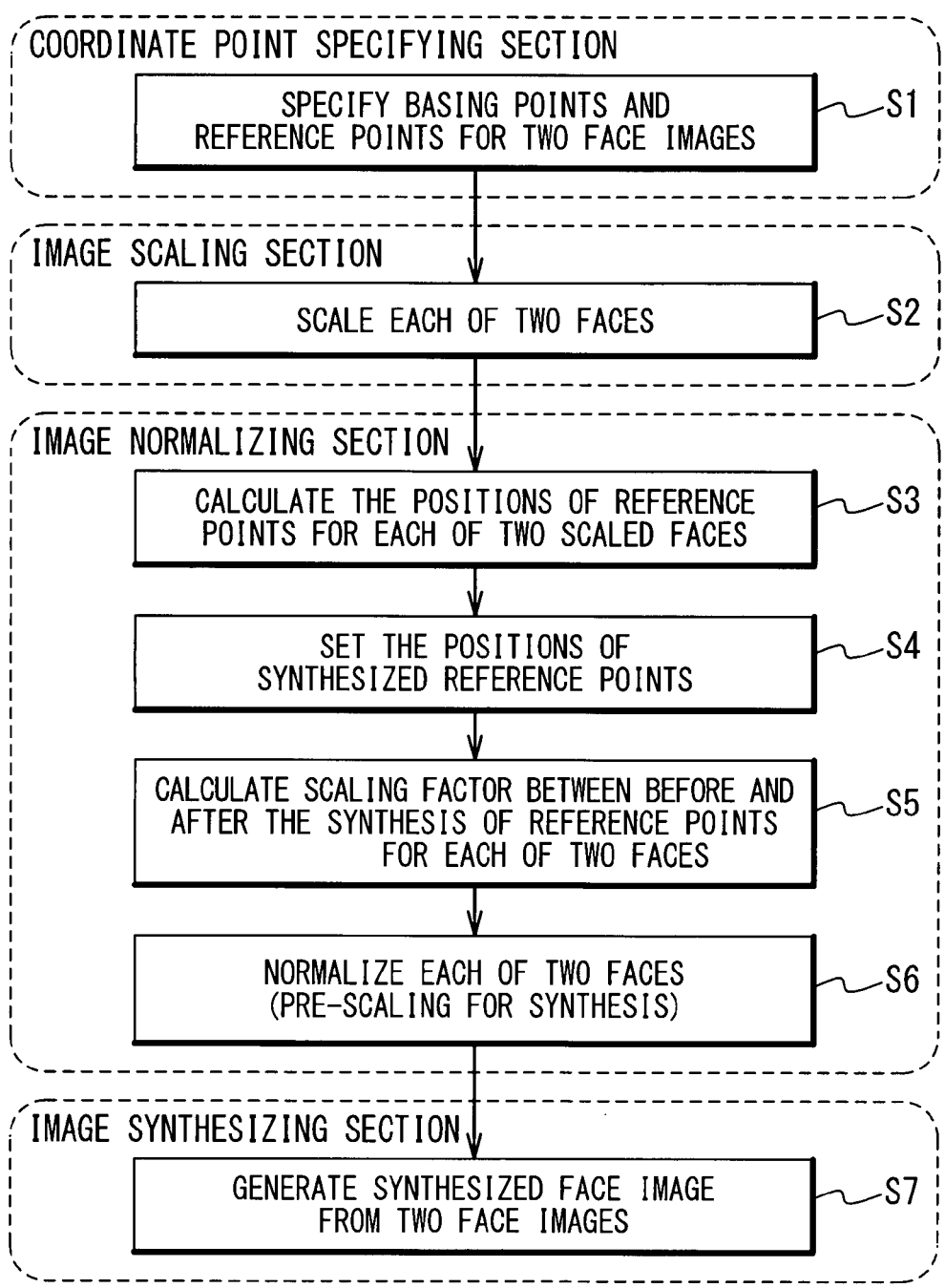
FIG. 5 is a flowchart showing an embodiment of the face image synthesis method according to the present invention.
Figure 6:
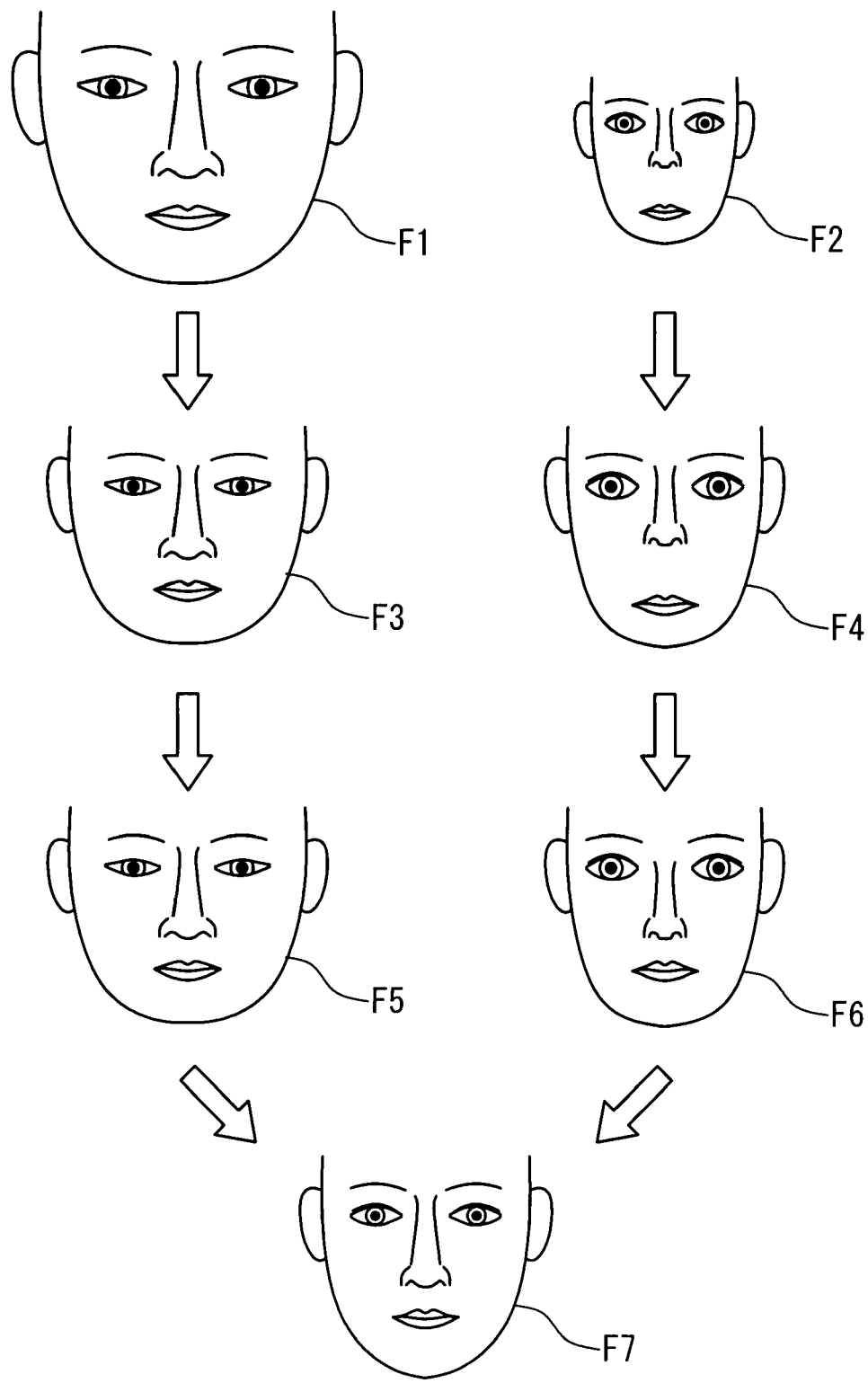
FIG. 6 is a diagram showing face image synthesis processes in an embodiment of the face image synthesis method according to the present invention.

FIG. 5 is a flowchart showing an embodiment of a face image synthesis method according to the present invention. The flowchart is broadly classified into seven steps S1 to S7. The coordinate point specifying section 10 executes step S1, the image scaling section 11 executes step S2, the image normalizing section executes steps 3 to 6, and the image synthesizing section 13 executes step S7. FIG. 6 is a diagram showing face image synthesis processes in the embodiment of the face image synthesis method according to the present invention, providing one example indicating how face images are synthesized.

Figure 7:
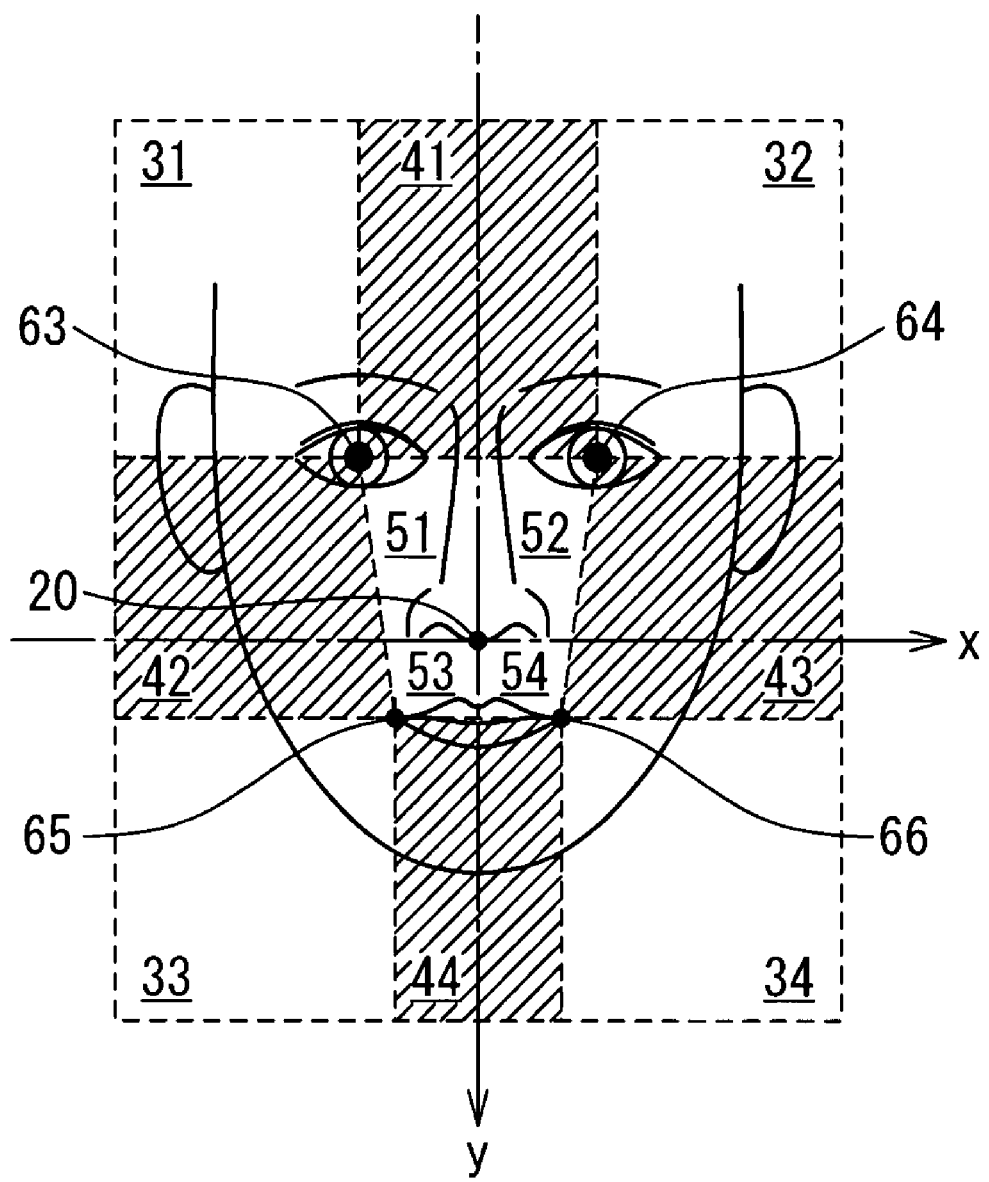
FIG. 7 is a diagram for explaining setting of a scaling factor at face normalization in an embodiment of the face image synthesis method according to the present invention.

Step S1: Two input face images S101 are inputted by a camera or the like. The input face image S101 is an image of a face or an image resembling a face, such as a human face, an animal's face, a doll, the front surface of an automobile, or the like. FIG. 7 shows an example of the input face image S101 as a face image F1 and a face image F2. The coordinate point specifying section 10 specifies, for each of the input face images S101, the basing point 62, the upper left reference point 63, the upper right reference point 64, the lower left reference point 65, and the lower right reference point 66, which are then stored into the storage device 2. This specification may be carried out by inputting with the pointing device 61 by the user while referring to the display device 67, or may be carried out by automatic extraction from the input face images by the program 5 stored in the face image synthesis apparatus 60. It is desirable that the basing point satisfies conditions: for example, it is easy to extract; there is in the vicinity a part whose color is different from that of the skin; it is located in the middle point between other parts (two eyes, mouth) whose colors are different from that of the skin, and the like. A point satisfying such conditions is exemplified by the lower edge of the nose (nostril center). The reference point is a point showing position of another part, such as a right eye center, a left eye center, both mouth ends, or the like, whose color is different from that of the skin, and it is preferable that positions being easily specified are specified.

Step S2: The image scaling section 11 matches face scales of the two face images S101 to generate images S103. Due to a difference in the sizes of the faces included in the input face images S101, matching the image sizes does not mean the match of the face scales. Thus, there is a possible method of matching the scales by using the length of the facial portion where little individual difference is observed. Frequently used as such a facial portion is the distance between the two eyes, which is typically approximately 6 cm regardless of the face and head sizes as often described in literatures of binocular stereo.

The image scaling section 11 rotates the images so that a line linking together the upper left reference point 63 and the upper right reference point 64 of each input face image S101 is oriented horizontally (in the width direction of the display device 67 when the face image synthesis apparatus 60 is held by hands in normally operated posture). Next, the image scaling section 11 calculates the distance between the two eye centers in the unit of pixel, then calculates the ratio of this calculated distance to a preset distance between the two eyes, that is, (set distance between the two eyes)/(distance between the two eyes in the image), and then multiplies the longitudinal and lateral sizes of the image by this ratio for enlargement or reduction. The image S103 obtained in this manner is indicated as face images F3 and F4 in FIG. 6. The face images F3 and F4 have the same distance between the two eyes.

Step S3: The image normalizing section 12 calculates the positional relationship among main facial parts (two eyes, nose, mouth) in the image S103, that is, calculates position of the reference points when the basing point is defined as an origin. Pixel coordinate values of the reference points when the basing point is defined as the origin indicate the positional relationship among the main facial parts.

Step S4: The image normalizing section 12, based on the two face images S103, calculates positions of the upper left reference point 63, the upper right reference point 64, the lower left reference point 65, and the lower right reference point 66. This corresponds to determining position of each reference point with respect to the basing point in the synthesized face image S105. The following method is used as an example of this calculation. Assume that the basing point is the origin, that coordinate at the position of the right eye center (upper left reference point 63) of the face image A is (xa, ya), that coordinate at the position of the right eye center of the face image B are (xb, yb), and that a synthesis ratio is p:q. In this condition, coordinates at the position of the right eye center in the synthesized face image S105 is set by formula below:

[Equation 1]

$$(x_s, y_s) = \left( \frac{qx_a + px_b}{p+q}, \frac{qy_a + py_b}{p+q} \right) \quad (1)$$

Step S5: The image normalizing section 12 calculates, for each of the two images S103, the ratio between the distances between the basing point and each reference point before and after synthesis (enlargement ratio or reduction ratio, hereinafter abbreviated as scaling factor). Referring to the example provided in the description of step 4, the ratio for the upper left reference point 63 of the face image A is (ra, sa)=(xs/xa, ys/ya), and the ratio for the upper left reference point 63 of the face image B is (rb, sb)=(xs/xb, ys/yb).

Step S6: The image normalizing section 12 normalizes the two images S103 (enlarges or reduces them for synthesis). Specifically, the image normalizing section 12, for each of the two images, moves the reference points to respective positions after synthesis by multiplication with the ratio calculated at step S5. Further, points other than the reference points, in accordance with their positions, are moved through enlargement or reduction by smoothly increasing or reducing the enlargement/reduction ratio calculated at step S5. In this case, the positions other than the reference points should be enlarged or reduced so that they do not become discontinuous. An example of such an enlargement or reduction method is shown below.

FIG. 7 is a diagram explaining setting of the scaling factor at face normalization in an embodiment of the face image synthesis method according to the present invention. As shown in FIG. 7, the face image is divided into 12 portions based on positions of the reference points. Regions 31, 32, 33, and 34 of FIG. 7 are regions whose x and y coordinates are both located outside of the reference points as viewed from a basing point 20. For these regions, scaling factors of their respective innermost points, that is, the reference points, are defined as scaling factors of arbitrary points therein. The scaling factor of the region 31 is the scaling factor of the upper left reference point 63. The scaling factor of the region 32 is the scaling factor of the upper right reference point 64. The scaling factor of the region 33 is the scaling factor of the lower left reference point 65. The scaling factor of the region 34 is the scaling factor of the lower right reference point 66.

Regions 41, 42, 43, and 44 of FIG. 7 are regions whose one of x and y coordinates is located outside of their respective reference points as viewed from the basing point 20 and whose the other one of x and y coordinates is located inside of their respective reference points as viewed from the basing point 20. The scaling factor of an arbitrary point located in these regions is determined by using a relative position between the point and the reference point in contact with this region. For example, consider obtaining the scaling factor of a point (x, y) in the region 41. Where, by using coordinates (x1, y1) of the upper left reference point 63 and coordinates (x2, y2) of the upper right reference point 64, the point (x, y) is expressed by:

[Equation 2]

$$x = \frac{vx_1 + ux_2}{u+v}, \tag{2}$$

the scaling factor of the point (x, y), by using the scaling factor (r1, r2) of the upper left reference point 63 and the scaling factor (r2, s2) of the upper right reference point 64, is set by:

[Equation 3]

$$(r, s) = \left(\frac{vr_1 + ur_2}{u+v}, \frac{vs_1 + us_2}{u+v}\right). \tag{3}$$

For the region 42, by expressing a y coordinate of a point inside the region 42 through interior division by using the coordinates of the upper left reference point 63 and the coordinates of the lower left reference point 65, setting is performed in the same manner.

For the region 43, by expressing an x coordinate of a point inside the region 43 through interior division by using the coordinates of the upper right reference point 64 and the coordinates of the lower right reference point 66, setting is performed in the same manner.

For the region 44, by expressing a y coordinate of a point inside the region 44 through interior division by using the coordinates of the lower left reference point 65 and the coordinates of the lower right reference point 66, setting is performed in the same manner.

Regions 51, 52, 53, and 54 of FIG. 7 are regions whose x and y coordinates are both located inside the reference points as viewed from the basing point and which are divided into four regions by an x axis and y axis forming an orthogonal coordinate system with an origin located at the basing point. Scaling factors of these regions 51, 52, 53, and 54 are determined in the following manner. The region 54 of a first quadrant whose the x and y coordinates are both positive is focused for explanation. Coordinates (x, y) of a point in the region 54 is, by using coordinates (x4, y4) of the lower right reference point 66, coordinates (x3, y3) of the lower left reference point 65, and coordinates (x2, y2) of the upper right reference point 64, expressed by:

[Equation 4]

$$(x, y) = \left(\frac{vx_3 + ux_4}{u+v}, \frac{v'y_2 + u'y_4}{u'+v'}\right). \tag{4}$$

In this case, the image normalizing section 12 sets the scaling factor of the point in the region 54 by formula below:

[Equation 5]

$$(r, s) = \left(\frac{vr_3 + ur_4}{u+v}, \frac{v's_2 + u's_4}{u'+v'}\right). \tag{5}$$

Setting in this manner permits the scaling factor to be set smoothly (seamlessly) as a whole while moving the reference point with a desired scaling factor. Once the scaling factors of all the points in the original image are set, each of the points is moved to coordinate of a value obtained by multiplying its coordinate by its scaling factor. A place in the middle where a value is lacked is filled through interpolation complementation. In this manner, the image S104 is generated. An example of the image S104 is shown as a face image F5 and a face image F6 in FIG. 6. The face image F5 and the face image F6 have facial portions (eyes, nose, mouth) located at the same position.

Such processing is performed for the following reason. If each quadrant is simply enlarged or reduced with the scaling factor of the reference point belonging to the quadrant, when the eyes and mouth are deviate from symmetric arrangement in the input face image S101, for example, a continuous line or texture included in the input face image S101 is discontinuously deformed in regions extending across the x or y coordinate, thereby providing an unnatural face image. With the scaling factor calculation method described above, a natural image is provided whose facial parts, lines, and texture change continuously.

Step S7: The image synthesizing section 13 generates the synthesized face image S105 by using the normalized images S104 and the inputted synthesis ratio S107. The synthesized face image S105 is obtained by matching the basing points 62 of the two images S104, which have been normalized at step S6, with origins and subjecting a luminance value or a color value for a pixel of each point on the coordinates to weighted averaging by using the synthesis ratio S107. In this case, it is not necessary to synthesize the entire face with a uniform synthesis ratio. For example, the two images S104 are synthesized with a ratio of 50:50 only for the surrounding of the two eyes and with a ratio of 0:100 for the other portions, so that partial synthesis is practiced only for the surrounding of the two eyes. The setting of such a synthesis ratio S107 may be previously stored in the storage device 2 or may be inputted from the input device.

The input face image S101 is not limited to an image obtained by photographing an actual human face. The input face image S101 may be, for example, an artificial image created by animation, CG, or the like, or may be the one, such as a doll or the front surface of an automobile (with a head light corresponding to the eyes), which can simulate a human face.

When the face image synthesis apparatus 60 is implemented by using the portable terminal such as a mobile phone, inputting the basing point 62, the upper left reference point 63, the upper right reference point 64, the lower left reference point 65, and the lower right reference point 66 at step S1 is performed by using the pointing device 61 while checking the input face image S101 displayed on the display screen of the display device 67. If a characteristic point detection program for extracting the basing point 62 and the reference points from the input face image S101 is previously installed in the portable terminal, inputting through the pointing device 60 is not required. Steps S2 and S3 can be executed by the arithmetic unit in the portable terminal. Step 4 can be implemented, for example, by inputting the synthesis ratio for the two images S103 by using the numeric keys of the portable terminal and then performing the calculation described above by the arithmetic unit of the portable terminal. Steps S5 and S6 can be implemented by the arithmetic unit of the portable terminal. Step S7 can be implemented, as step S4, by inputting the synthesis ratio for the two images S104 by using the numeric keys of the portable terminal and then performing the calculation described above by the arithmetic unit of the portable terminal.

According to the present invention, under environments in which an input interface or calculation processing capability is limited, a ghost-free synthesized face image of high quality can be created, which can be installed in a camera-equipped mobile phone, a PDA, or the like.

The most important point to provide feeling that an image obtained by synthesizing two face images actually exists is that characteristic portions, such as eyes, match with each other. Examples of portions where the dislocations are outstandingly observed at synthesis are two eyes, nostrils, mouths, and eyebrows. The eyebrows, unless drawn or provided with facial expression, have high correlation with position of eyes. Therefore, the position of the eyebrows is appropriately processed if the position of the eyes is appropriately processed. Now, focus on the two eyes, nostrils, and mouth. With a lower edge point of the nose (which is the middle point between the two nostrils) defined as the basing point, a right eye center, four points including the right eye center, the left eye center, the right mouth end, and the left mouth end are defined as reference points of the respective regions. It is preferable to define the lower edge point of the nose as the basing point because: (1) this point is located in the middle among the right eye, the left eye, the right mouth end, and the left mouth end, and (2) this point is easily extracted due to its characteristic that it is located in the middle between the two nostrils. If any of the other four points (for example, the right eye center) is defined as the basing point, when a point (for example, the left mouth end) distant from this point is rearranged after enlarged or reduced based on the distance from the basing point, significant deviation is likely to occur as a result of the enlargement or reduction. If a distance image or the like including information on a three dimensional shape can be obtained, the apex of the nose can be adopted as the basing point.

By scaling the entire image and determining the point located at the lower edge of the nose or the like as the basing point, the arrangement of the major parts is defined by the basing point and four reference points. Thus, by previously determining arrangement of the reference points after synthesis, enlarging or reducing each of images to be synthesized so that the positions of the reference points match with the position after synthesis, matching the basing points, and then performing weighted averaging by the color or the luminance, a synthetic image with no ghost appearing in the major parts can be obtained so that an objects of the present invention can be achieved.

A first effect of the present invention is that, even with a limited input interface such as the portable terminal, execution is possible without imposing load on the operator, because the face synthesis can be executed by specifying five points including the point located at the lower edge of the nose, the right eye center, the left eye center, the right mouth end, and the left mouth end.

A second effect of the present invention is that execution is possible even with limited calculation processing capability such as provided by the portable terminal, because the processing can be performed only through enlargement/reduction based on the five points without using a polygon mapping.

A third effect of the present invention is that, in a facial synthesized image, ghost is not generated at a place, such as eyes or the like, whose color is largely different from that of the skin, because enlargement or reduction is performed so that these places in all the original images are matched.

The present invention is not limited to the examples described above, and it is obvious that various modifications and variations can be appropriately made in these examples within the range of technical ideas of the present invention.

What is claimed is:

1. A face image synthesis apparatus comprising:
   a storage device configured to store a plurality of face images and a plurality of feature points including an origin and being set to each of the plurality of face images; and
   a 2D arithmetic processing unit configured to generate a plurality of deformed face images, origins thereof are located in a same position, and the plurality of feature points thereof are located in same positions, by deforming the plurality of face images, and to generate a synthesized face image from the plurality of deformed face images by synthesizing the plurality of face images to each other,
   wherein the plurality of feature points includes a basing point and a reference point, and
   the 2D arithmetic processing unit includes:
   an image scaling section configured to generate a plurality of scaled face images by scaling the plurality of face images based on the plurality of face images and the plurality of feature points to a distance between preset feature points of each of the plurality of scaled face images being same;
   an image normalizing section configured to calculate a location of the reference point from the origin in each of the plurality of scaled face images based on the plurality of scaled face images and the plurality of feature points, to set a location of the reference point after face image synthesis, and to generate the plurality of deformed face images which are normalized to the reference point of each of the plurality of scaled face images being located in a position of the reference point after face image synthesis; and
   an image synthesizing section configured to generate the synthesized face image by matching the reference point of each of the plurality of deformed face images and calculating a weighted average of at least one of a color and a luminance by a synthesis ratio for each pixel based on the plurality of deformed face images and the plurality of feature points, and
   the plurality of feature points includes a first feature point located in first quadrant, a second feature point located in second quadrant, a third feature point located in third quadrant and a fourth feature point located in fourth quadrant from the origin.

2. The face image synthesis apparatus according to claim 1, wherein the 2D arithmetic processing unit generates the synthesized face image by averaging the plurality of deformed face images for each pixel.

3. The face image synthesis apparatus according to claim 1, wherein the 2D arithmetic processing unit calculates scaling factors to be continuous in an arbitrary region of the deformed face image, supposing that a coordinate of an arbitrary point of an arbitrary face image of the plurality of face images is (x1, y1), and the arbitrary point is moved to (x2, y2) in a corresponding deformed face image, and the scaling factors are represented by (r, s)=(x2/x1, y2/y1).

4. The face image synthesis apparatus according to claim 1, further comprising:
   a portable package including the storage device and the 2D arithmetic processing unit;
   a display configured to display the plurality of face images and the synthesized face image; and
   an input unit configured to accept an input of the plurality of feature points.

5. The face image synthesis apparatus according to claim 1, further comprising an input device to specify the plurality of feature points manually.

6. A face image synthesis method comprising:
   (a) obtaining a plurality of face images and a plurality of feature points including an origin which are set to each of the plurality of face images;
   (b) generating by 2D processing unit, a plurality of deformed face images by deforming the plurality of face images to include mutually at least two of the plurality of feature points located at same positions; and
   (c) generating a synthesized face image based on the plurality of deformed face images by synthesizing the plurality of face images to each other,
   wherein the plurality of feature points includes a basing point and a reference point, and a first feature point located in first quadrant, a second feature point located in second quadrant, a third feature point located in third quadrant and a fourth feature point located in fourth quadrant from the origin are included in the plurality of feature points, and
   said (b) generating includes:
   (b1) generating a plurality of scaled face images by scaling the plurality of face images based on the plurality of face images and the plurality of feature points to a distance between preset feature points of each of the plurality of scaled face images being same;
   (b2) calculating a location of the reference point from the origin in each of the plurality of scaled face images based on the plurality of scaled face images and the plurality of feature points, setting a location of the reference point after face image synthesis, and generating the plurality of deformed face images which are normalized to the reference point of each of the plurality of scaled face images being located in a position of the reference point after face image synthesis; and (c) generating includes:
   (c1) generating the synthesized face image by matching the reference point of each of the plurality of deformed face images and calculating a weighted average of at least one of a color and a luminance by a synthesis ratio for each pixel based on the plurality of deformed face images and the plurality of feature points.

7. The face image synthesis method according to claim 6, wherein (b2) calculating includes:
   (b21) calculating scaling factors to be continuous in an arbitrary region of the deformed face image, supposing that a coordinate of an arbitrary point of an arbitrary face image of the plurality of face images is (x1, y1, and the arbitrary point is moved to (x2, y2) in a corresponding deformed face image, and the scaling factors are represented by (r,s)=(x2/x1, y2/y1).

8. The face image synthesis method according to claim 6, further comprising specifying the plurality of feature points manually.

9. A computer program product embodied on a computer-readable storage device and comprising code that, when executed, causes a computer to perform the method according to claim 6.

10. A face image synthesis apparatus comprising:
    an image scaling unit configured to generate by 2D processing, a plurality of deformed face images by deforming each of a plurality of face images on which a plurality of feature points and a reference point are set so that the plurality of feature points are located at same positions for the plurality of deformed face images; and
    a synthesized image generating unit configured to generate a synthesized face image by deforming the plurality of deformed face images to the reference points thereof having same location, and synthesizing at least one of color and luminance,
    wherein the plurality of feature points includes a first feature point located in first quadrant, a second feature point located in second quadrant, a third feature point located in third quadrant and a fourth feature point located in fourth quadrant from the origin, wherein
    each of the plurality of face images subjected to face image synthesis is 2D image data and synthesized to each other.

11. The face image synthesis apparatus according to claim 10, wherein the plurality of feature points correspond to a right eye and a left eye.

12. The face image synthesis apparatus according to claim 10, wherein the reference point corresponds to a right eye, a left eye, a nose or a mouth edge.

13. The face image synthesis apparatus according to claim 10, wherein the synthesized image generating unit performs said deforming by referring a location of the reference point from a basing point when deforming each of the plurality of deformed face images to the reference point thereof being at a same position.

14. The face image synthesis apparatus according to claim 13, wherein the basing point corresponds to a lower edge of a nose or an apex of a nose.

15. The face image synthesis apparatus according to claim 10, further comprising an input device to specify the plurality of feature points manually.

16. A face image synthesis apparatus for synthesizing at least two face images or face-like images as input images to generate an other image, comprising:
    an image scaling means for conforming scales of the input images by using coordinates of five points corresponding to a right eye, a left eye, a nose and two positions on a mouth of the input images;
    an image normalizing means for generating normalized images by scaling each of the input images to the five points being located at predetermined positions; and
    an image synthesis means for generating said other image by synthesizing the normalized images, wherein
    the two face images or face-like images subjected to image synthesis is 2D image data and synthesized to each other.

17. A face image synthesis method comprising:
    (d) generating, by an arithmetic processing unit, a plurality of deformed face images by deforming each of a plurality of face images on which a plurality of feature points and a reference point are set so that the plurality of feature points are located at same positions for the plurality of deformed face images; and
    (e) generating a synthesized face image by deforming the plurality of deformed face images to the reference points thereof having same location, and synthesizing at least one of color and luminance, wherein the plurality of feature points includes a first feature point located in first quadrant, a second feature point located in second quadrant, a third feature point located in third quadrant and a fourth feature point located in fourth quadrant from the origin, and wherein each of the plurality of face images subjected to face image synthesis is 2D image data and synthesized to each other.

18. The face image synthesis method according to claim 17, wherein the plurality of feature points correspond to a right eye and a left eye.

19. The face image synthesis method according to claim 17, wherein the reference point corresponds to a right eye, a left eye, a nose or a mouth edge.

20. The face image synthesis method according to claim 17, wherein (e) generating includes:

(e1) performing said deforming by referring a location of the reference point from a basing point when deforming each of the plurality of deformed face images to the reference point thereof being at a same position.

21. The face image synthesis method according to claim 20, wherein the basing point corresponds to a lower edge of a nose or an apex of a nose.

22. A face image synthesis method for synthesizing at least two face images or face-like images as input images to generate an other image, comprising:

conforming scales of the input images by using coordinates of five points corresponding to a right eye, a left eye, a nose and two positions on a mouth of the input images;

generating normalized images, by a 2D arithmetic processing unit, by scaling each of the input images to the five points being located at predetermined positions; and generating said other image by synthesizing the normalized images by synthesizing the least two face images to each other or face-like images to each other.

23. A computer program product embodied on a computer-readable storage device and comprising code that, when executed, causes a computer to perform the method according to claim 17.

24. A face image synthesis apparatus according to claim 16, further comprising an input device to specify the plurality of feature points manually.

25. The face image synthesis method according to claim 17, further comprising specifying the plurality of feature points manually.

26. A face image synthesis method according to claim 22, further comprising specifying the plurality of feature points manually.

* * * * *